No. 849,232. PATENTED APR. 2, 1907.
O. B. HAGA.
WHIFFLETREE HOOK.
APPLICATION FILED NOV. 8, 1906.
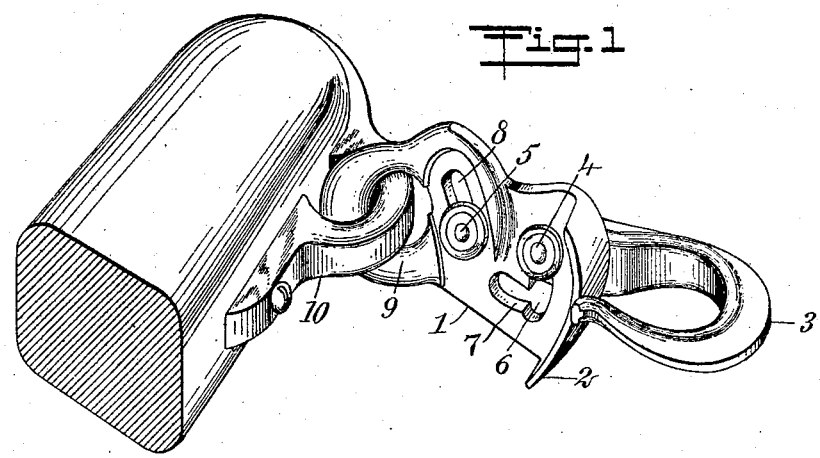
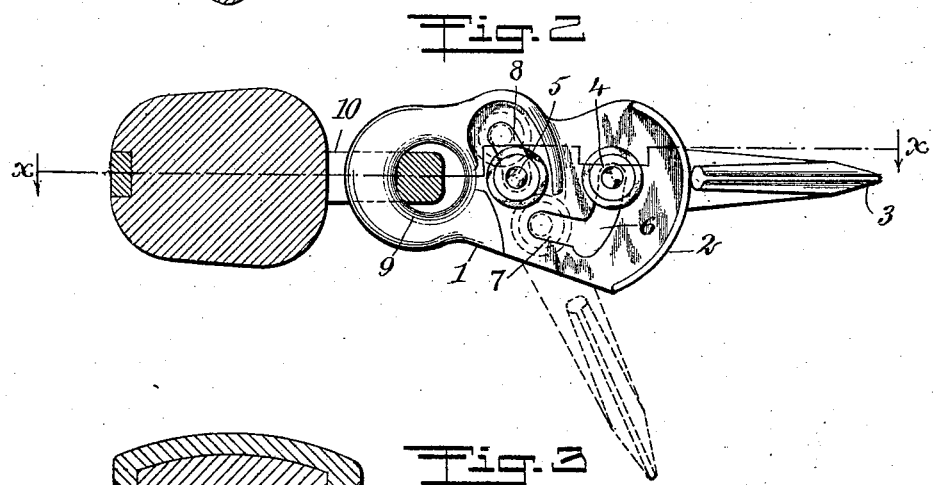
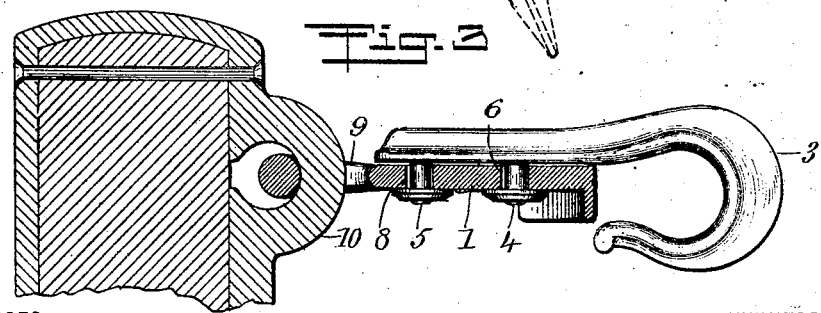
WITNESSES
F. D. Swett.
C. R. Ferguson
INVENTOR
Ottar B. Haga
BY Munn & Co
ATTORNEYS
THE NORRIS PETERS CO., WASHINGTON, D. C.

UNITED STATES PATENT OFFICE.

OTTAR BERG HAGA, OF DOGDEN, NORTH DAKOTA, ASSIGNOR OF ONE-HALF TO RALPH A. PENCE, OF DOGDEN, NORTH DAKOTA.

WHIFFLETREE-HOOK.

No. 849,232.     Specification of Letters Patent.     Patented April 2, 1907.

Application filed November 8, 1906. Serial No. 342,577.

*To all whom it may concern:*

Be it known that I, OTTAR BERG HAGA, a citizen of the United States, and a resident of Dogden, in the county of McLean and State of North Dakota, have invented a new and Improved Whiffletree-Hook, of which the following is a full, clear, and exact description.

This invention relates to improvements in hooks for attaching harness-traces to whiffletrees, the object being to provide a device of this character so constructed that the cockeye of a trace may be readily engaged therewith or detached therefrom, but cannot be accidentally detached.

I will describe a whiffletree-hook embodying my invention and then point out the novel features in the appended claims.

Reference is to be had to the accompanying drawings, forming a part of this specification, in which similar characters of reference indicate corresponding parts in all the figures.

Figure 1 is a perspective view of a whiffletree-hook embodying my invention. Fig. 2 is a side view thereof, and Fig. 3 is a section on the line $x\,x$ of Fig. 2.

The device comprises a plate 1, having at its forward end an inwardly-extended segmental flange 2, with which the end of the hook member 3 may engage and prevent any displacement of the trace-eye or cockeye engaging therewith. The shank portion of the hook is provided with two studs 4 5, the said studs being headed, and the stud 4 passes through an L-shaped slot having a vertical portion 6 and a rearwardly-extended and substantially horizontal portion 7, while the stud 5 passes through the curved slot 8 formed in the plate. On the plate 1 is an eye portion 9, which receives a strap-like clip 10, attached to the whiffletree.

In the operation of securing a trace to the hook the hook is to be turned downward and the stud moved into the horizontally-disposed portion 7 of the vertical slot and the stud 5 moved into the upper portion of the slot 8, as indicated by dotted lines in Fig. 2. While in this position the end of the hook 3 will be below the segmental flange 2, so that the trace may be readily engaged therewith, and upon the forward movement of strain of the trace the hook will be moved to its horizontal position, as indicated by full lines in the drawings. By the arrangement of the angular slot it is obvious that the hook may be swung downward to the position above described, which would not be possible—that is, to swing the hook in below the flange—if the said slot were made straight.

Having thus described my invention, I claim as new and desire to secure by Letters Patent—

1. In a whiffletree-hook, a plate having a slot of angular formation and a slot rearward of the first-named slot, a hook, and lugs extended from the shank of the hook into said slots.

2. A whiffletree-hook, comprising a plate member having a substantially L-shaped slot and a curved slot rearward of the L-shaped slot, a segmental flange extended laterally from the forward end of the plate, a hook member, and lugs on the shank of said hook member passing into said slots.

3. A whiffletree-hook, comprising a plate having a segmental-shaped forward end and provided with an eye at its rear end, and with slots intermediate of its ends, one slot being angular and the other curved, and a hook having lugs engaging the slots of the plate.

4. A whiffletree-hook, comprising a plate, and a hook, one of the said parts being provided with two slots, one of which is angular and the other curved, and the other part with lugs engaging the slots.

In testimony whereof I have signed my name to this specification in the presence of two subscribing witnesses.

OTTAR BERG HAGA.

Witnesses:
    GRACE I. WEST,
    W. L. GRAHAM.